US012039984B2

(12) United States Patent
Xia et al.

(10) Patent No.: US 12,039,984 B2
(45) Date of Patent: Jul. 16, 2024

(54) AUDIO ENCODING AND DECODING METHOD AND AUDIO ENCODING AND DECODING DEVICE

(71) Applicant: Huawei Technologies Co., Ltd., Shenzhen (CN)

(72) Inventors: Bingyin Xia, Beijing (CN); Jiawei Li, Beijing (CN); Zhe Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/864,116

(22) Filed: Jul. 13, 2022

(65) Prior Publication Data

US 2022/0358941 A1 Nov. 10, 2022

Related U.S. Application Data

(63) Continuation of application No. PCT/CN2021/071328, filed on Jan. 12, 2021.

(30) Foreign Application Priority Data

Jan. 13, 2020 (CN) ........................ 202010033326.X

(51) Int. Cl.
*G10L 19/02* (2013.01)
*G10L 25/18* (2013.01)

(52) U.S. Cl.
CPC .............. *G10L 19/02* (2013.01); *G10L 25/18* (2013.01)

(58) Field of Classification Search
CPC ................................ G10L 19/02; G10L 25/18
See application file for complete search history.

(56) References Cited

U.S. PATENT DOCUMENTS

2009/0271204 A1* 10/2009 Tammi ................ G10L 19/0208 704/226
2012/0010879 A1* 1/2012 Tsujino ................... G10L 19/06 704/203
2015/0162010 A1 6/2015 Ishikawa et al.
2016/0180854 A1* 6/2016 Lecomte ............. G10L 19/0204 704/205
2018/0182403 A1 6/2018 Kamano et al.
(Continued)

FOREIGN PATENT DOCUMENTS

CN 1831940 A 9/2006
CN 101681623 A 3/2010
(Continued)

*Primary Examiner* — Bryan S Blankenagel
(74) *Attorney, Agent, or Firm* — Leydig, Voit & Mayer, Ltd.

(57) ABSTRACT

The present disclosure discloses an audio encoding and decoding method and an audio encoder and decoder. The audio encoding method includes: obtaining a current frame of an audio signal, where the current frame includes a high frequency band signal and a low frequency band signal; obtaining a first encoding parameter based on the high frequency band signal and the low frequency band signal; obtaining a second encoding parameter of the current frame based on the high frequency band signal, where the second encoding parameter includes tone component information; and performing bitstream multiplexing on the first encoding parameter and the second encoding parameter, to obtain an encoded bitstream.

13 Claims, 5 Drawing Sheets

(56) References Cited

U.S. PATENT DOCUMENTS

| | | | |
|---|---|---|---|
| 2019/0035413 A1 | 1/2019 | Suzuki et al. | |
| 2021/0151062 A1* | 5/2021 | Kjoerling | G10L 21/038 |

FOREIGN PATENT DOCUMENTS

| | | | |
|---|---|---|---|
| CN | 102194458 | A | 9/2011 |
| CN | 104584124 | A | 4/2015 |
| WO | 2017178329 | A1 | 10/2017 |

* cited by examiner

AUDIO ENCODING AND DECODING METHOD AND AUDIO ENCODING AND DECODING DEVICE

CROSS-REFERENCE TO RELATED APPLICATIONS

This application is a continuation of International Application No. PCT/CN2021/071328, filed on Jan. 12, 2021, which claims priority to Chinese Patent Application No. 202010033326.X, filed on Jan. 13, 2020. The disclosures of the aforementioned applications are hereby incorporated by reference in their entireties.

TECHNICAL FIELD

This application relates to the field of audio signal encoding and decoding technologies, and in particular, to an audio encoding and decoding method and an audio encoding and decoding device.

BACKGROUND

As quality of life is improved, a requirement for high-quality audio is constantly increased. To better transmit an audio signal on a limited bandwidth, the audio signal usually needs to be encoded first, and then an encoded bitstream is transmitted to a decoder side. The decoder side decodes the received bitstream to obtain a decoded audio signal, and the decoded audio signal is used for play.

How to improve quality of the decoded audio signal becomes a technical problem that urgently needs to be resolved.

SUMMARY

Embodiments of this application provide an audio encoding and decoding method and an audio encoding and decoding device, to improve quality of a decoded audio signal.

To resolve the foregoing technical problem, the embodiments of this application provide the following technical solutions.

A first aspect of the present disclosure provides an audio encoding method. The method includes: obtaining a current frame of an audio signal, where the current frame includes a high frequency band signal and a low frequency band signal; obtaining a first encoding parameter based on the high frequency band signal and the low frequency band signal; obtaining a second encoding parameter of the current frame based on the high frequency band signal, where the second encoding parameter includes tone component information; and performing bitstream multiplexing on the first encoding parameter and the second encoding parameter, to obtain an encoded bitstream.

With reference to the first aspect, in an embodiment, the obtaining a second encoding parameter of the current frame based on the high frequency band signal includes: detecting whether the high frequency band signal includes a tone component; and if the high frequency band signal includes a tone component, obtaining the second encoding parameter of the current frame based on the high frequency band signal.

With reference to the first aspect and the foregoing embodiment of the first aspect, in an embodiment, the tone component information includes at least one of tone component quantity information, tone component location information, tone component amplitude information, or tone component energy information.

With reference to the first aspect and the foregoing embodiments of the first aspect, in an embodiment, the second encoding parameter further includes a noise floor parameter.

With reference to the first aspect and the foregoing embodiments of the first aspect, in an embodiment, the noise floor parameter is used to indicate noise floor energy.

A second aspect of the present disclosure provides an audio decoding method. The method includes: obtaining an encoded bitstream; performing bitstream demultiplexing on the encoded bitstream, to obtain a first encoding parameter of a current frame of an audio signal and a second encoding parameter of the current frame, where the second encoding parameter of the current frame includes tone component information; obtaining a first high frequency band signal of the current frame and a first low frequency band signal of the current frame based on the first encoding parameter; obtaining a second high frequency band signal of the current frame based on the second encoding parameter, where the second high frequency band signal includes a reconstructed tone signal; and obtaining a fused high frequency band signal of the current frame based on the second high frequency band signal of the current frame and the first high frequency band signal of the current frame.

With reference to the second aspect, in an embodiment, the first high frequency band signal includes at least one of a decoded high frequency band signal obtained by performing direct decoding based on the first encoding parameter, and an extended high frequency band signal obtained by performing frequency band extension based on the first low frequency band signal.

With reference to the second aspect and the foregoing embodiment of the second aspect, in an embodiment, if the first high frequency band signal includes the extended high frequency band signal, the obtaining a fused high frequency band signal of the current frame based on the second high frequency band signal of the current frame and the first high frequency band signal of the current frame includes: if a value of a spectrum of a reconstructed tone signal on a current frequency of a current sub-band of the current frame meets a preset condition, obtaining a fused high frequency band signal on the current frequency based on a spectrum of an extended high frequency band signal on the current frequency and noise floor information of the current sub-band; or if a value of a spectrum of a reconstructed tone signal on a current frequency of a current sub-band of the current frame does not meet a preset condition, obtaining a fused high frequency band signal on the current frequency based on the spectrum of the reconstructed tone signal on the current frequency.

With reference to the second aspect and the foregoing embodiments of the second aspect, in an embodiment, the noise floor information includes a noise floor gain parameter.

With reference to the second aspect and the foregoing embodiments of the second aspect, in an embodiment, the noise floor gain parameter of the current sub-band is obtained based on a width of the current sub-band, energy of a spectrum of an extended high frequency band signal of the current sub-band, and noise floor energy of the current sub-band.

With reference to the second aspect and the foregoing embodiment of the second aspect, in an embodiment, if the first high frequency band signal includes the decoded high frequency band signal and the extended high frequency band signal, the obtaining a fused high frequency band signal of the current frame based on the second high frequency band signal of the current frame and the first high frequency band signal of the current frame includes: if a value of a spectrum of a reconstructed tone signal on a current frequency of a current sub-band of the current frame does not meet a preset condition, obtaining a fused high frequency band signal on the current frequency based on the spectrum of the reconstructed tone signal on the current frequency; or if a value of a spectrum of a reconstructed tone signal on a current frequency of a current sub-band of the current frame meets a preset condition, obtaining a fused high frequency band signal on the current frequency based on a spectrum of an extended high frequency band signal on the current frequency, a spectrum of a decoded high frequency band signal on the current frequency, and noise floor information of the current sub-band.

With reference to the second aspect and the foregoing embodiments of the second aspect, in an embodiment, the noise floor information includes a noise floor gain parameter.

With reference to the second aspect and the foregoing embodiments of the second aspect, in an embodiment, the noise floor gain parameter of the current sub-band is obtained based on a width of the current sub-band, noise floor energy of the current sub-band, energy of a spectrum of an extended high frequency band signal of the current sub-band, and energy of a spectrum of a decoded high frequency band signal of the current sub-band.

With reference to the second aspect and the foregoing embodiments of the second aspect, in an embodiment, if the first high frequency band signal includes the decoded high frequency band signal and the extended high frequency band signal, the method further includes: selecting at least one signal from the decoded high frequency band signal, the extended high frequency band signal, and the reconstructed tone signal based on preset indication information or indication information obtained through decoding, to obtain the fused high frequency band signal of the current frame.

With reference to the second aspect and the foregoing embodiments of the second aspect, in an embodiment, the second encoding parameter further includes a noise floor parameter used to indicate the noise floor energy.

With reference to the second aspect and the foregoing embodiments of the second aspect, in an embodiment, the preset condition includes: the value of the spectrum of the reconstructed tone signal is 0 or less than a preset threshold.

A third aspect of the present disclosure provides an audio encoder, including: a signal obtaining unit, configured to obtain a current frame of an audio signal, where the current frame includes a high frequency band signal and a low frequency band signal; a parameter obtaining unit, configured to: obtain a first encoding parameter based on the high frequency band signal and the low frequency band signal; and obtain a second encoding parameter of the current frame based on the high frequency band signal, where the second encoding parameter includes tone component information; and an encoding unit, configured to perform bitstream multiplexing on the first encoding parameter and the second encoding parameter, to obtain an encoded bitstream.

With reference to the third aspect, in an embodiment, the parameter obtaining unit is specifically further configured to: detect whether the high frequency band signal includes a tone component; and if the high frequency band signal includes a tone component, obtain the second encoding parameter of the current frame based on the high frequency band signal.

With reference to the third aspect and the foregoing embodiment of the third aspect, in an embodiment, the tone component information includes at least one of tone component quantity information, tone component location information, tone component amplitude information, or tone component energy information.

With reference to the third aspect and the foregoing embodiments of the third aspect, in an embodiment, the second encoding parameter further includes a noise floor parameter.

With reference to the third aspect and the foregoing embodiments of the third aspect, in an embodiment, the noise floor parameter is used to indicate noise floor energy.

A fourth aspect of the present disclosure provides an audio decoder, including: a receiving unit, configured to obtain an encoded bitstream; a demultiplexing unit, configured to perform bitstream demultiplexing on the encoded bitstream, to obtain a first encoding parameter of a current frame of an audio signal and a second encoding parameter of the current frame, where the second encoding parameter of the current frame includes tone component information; an obtaining unit, configured to: obtain a first high frequency band signal of the current frame and a first low frequency band signal of the current frame based on the first encoding parameter; and obtain a second high frequency band signal of the current frame based on the second encoding parameter, where the second high frequency band signal includes a reconstructed tone signal; and a fusion unit, configured to obtain a fused high frequency band signal of the current frame based on the second high frequency band signal of the current frame and the first high frequency band signal of the current frame.

With reference to the fourth aspect, in an embodiment, the first high frequency band signal includes at least one of a decoded high frequency band signal obtained by performing direct decoding based on the first encoding parameter, and an extended high frequency band signal obtained by performing frequency band extension based on the first low frequency band signal.

With reference to the fourth aspect and the foregoing embodiment of the fourth aspect, in an embodiment, if the first high frequency band signal includes the extended high frequency band signal, the fusion unit is specifically configured to: if a value of a spectrum of a reconstructed tone signal on a current frequency of a current sub-band of the current frame meets a preset condition, obtain a fused high frequency band signal on the current frequency based on a spectrum of an extended high frequency band signal on the current frequency and noise floor information of the current sub-band; or if a value of a spectrum of a reconstructed tone signal on a current frequency of a current sub-band of the current frame does not meet a preset condition, obtain a fused high frequency band signal on the current frequency based on the spectrum of the reconstructed tone signal on the current frequency.

With reference to the fourth aspect and the foregoing embodiments of the fourth aspect, in an embodiment, the noise floor information includes a noise floor gain parameter.

With reference to the fourth aspect and the foregoing embodiments of the fourth aspect, in an embodiment, the noise floor gain parameter of the current sub-band is obtained based on a width of the current sub-band, energy of a spectrum of an extended high frequency band signal of the current sub-band, and noise floor energy of the current sub-band.

With reference to the fourth aspect and the foregoing embodiment of the fourth aspect, in an embodiment, if the first high frequency band signal includes the decoded high frequency band signal and the extended high frequency band signal, the fusion unit is specifically configured to: if a value of a spectrum of a reconstructed tone signal on a current frequency of a current sub-band of the current frame does not meet a preset condition, obtain a fused high frequency band signal on the current frequency based on the spectrum of the reconstructed tone signal on the current frequency; or if a value of a spectrum of a reconstructed tone signal on a current frequency of a current sub-band of the current frame meets a preset condition, obtain a fused high frequency band signal on the current frequency based on a spectrum of an extended high frequency band signal on the current frequency, a spectrum of a decoded high frequency band signal on the current frequency, and noise floor information of the current sub-band.

With reference to the fourth aspect and the foregoing embodiments of the fourth aspect, in an embodiment, the noise floor information includes a noise floor gain parameter.

With reference to the fourth aspect and the foregoing embodiments of the fourth aspect, in an embodiment, the noise floor gain parameter of the current sub-band is obtained based on a width of the current sub-band, noise floor energy of the current sub-band, energy of a spectrum of an extended high frequency band signal of the current sub-band, and energy of a spectrum of a decoded high frequency band signal of the current sub-band.

With reference to the fourth aspect and the foregoing embodiments of the fourth aspect, in an embodiment, if the first high frequency band signal includes the decoded high frequency band signal and the extended high frequency band signal, the fusion unit is further configured to: select at least one signal from the decoded high frequency band signal, the extended high frequency band signal, and the reconstructed tone signal based on preset indication information or indication information obtained through decoding, to obtain the fused high frequency band signal of the current frame.

With reference to the fourth aspect and the foregoing embodiments of the fourth aspect, in an embodiment, the second encoding parameter further includes a noise floor parameter used to indicate the noise floor energy.

With reference to the fourth aspect and the foregoing embodiments of the fourth aspect, in an embodiment, the preset condition includes: the value of the spectrum of the reconstructed tone signal is 0 or less than a preset threshold.

A fifth aspect of the present disclosure provides an audio encoding device, including at least one processor. The at least one processor is configured to: be coupled to a memory, and read and execute instructions in the memory, to implement the method in the first aspect.

A sixth aspect of the present disclosure provides an audio decoding device, including at least one processor. The at least one processor is configured to: be coupled to a memory, and read and execute instructions in the memory, to implement the method in the second aspect.

According to a seventh aspect, an embodiment of this application provides a computer-readable storage medium. The computer-readable storage medium stores instructions, and when the instructions are run on a computer, the computer is enabled to perform the method in the first aspect or the second aspect.

According to an eighth aspect, an embodiment of this application provides a computer program product including instructions. When the computer program product is run on a computer, the computer is enabled to perform the method in the first aspect or the second aspect.

According to a ninth aspect, an embodiment of this application provides a communications apparatus. The communications apparatus may include an entity such as an audio encoding and decoding device or a chip. The communications apparatus includes a processor. Optionally, the communications apparatus further includes a memory. The memory is configured to store instructions, and the processor is configured to execute the instructions in the memory, so that the communications apparatus performs the method in the first aspect or the second aspect.

According to a tenth aspect, this application provides a chip system. The chip system includes a processor, configured to support an audio encoding and decoding device to implement functions in the foregoing aspects, for example, sending or processing data and/or information in the foregoing methods. In a possible design, the chip system further includes a memory, and the memory is configured to store program instructions and data that are necessary for an audio encoding and decoding device. The chip system may include a chip, or may include a chip and another discrete component.

It can be learned from the foregoing descriptions that, in the embodiments of the present disclosure, the audio encoder encodes the tone component information, so that the audio decoder can decode the audio signal based on the received tone component information, and can more accurately recover the tone component in the audio signal, thereby improving quality of the decoded audio signal.

DESCRIPTION OF EMBODIMENTS

The following describes the embodiments of this application with reference to accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms “include”, “have”, and any other variants mean to cover the non-exclusive inclusion, so that a process, method, system, product, or device that includes a series of units is not necessarily limited to those units, but may include other units not expressly listed or inherent to such a process, method, system, product, or device.

An audio signal in the embodiments of this application is an input signal in an audio encoding device, and the audio signal may include a plurality of frames. For example, a current frame may be specifically a frame in the audio signal. In the embodiments of this application, an example of encoding and decoding the audio signal of the current frame is used for description. A frame before or after the current frame in the audio signal may be correspondingly encoded and decoded according to an encoding and decoding mode of the audio signal of the current frame. An encoding and decoding process of the frame before or after the current frame in the audio signal is not described. In addition, the audio signal in the embodiments of this application may be a mono audio signal, or may be a stereo signal. The stereo signal may be an original stereo signal, or may be a stereo signal formed by two channels of signals (a left-channel signal and a right-channel signal) included in a multi-channel signal, or may be a stereo signal formed by two channels of signals generated by at least three channels of signals included in a multi-channel signal. This is not limited in the embodiments of this application.

Figure 1:
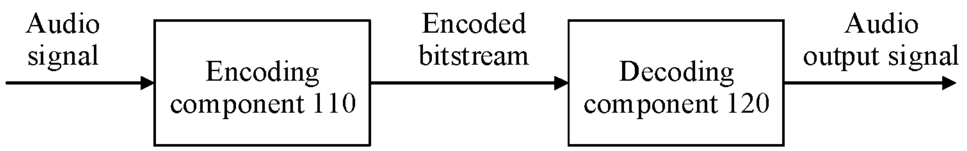
FIG. 1 is a schematic diagram of a structure of an audio encoding and decoding system according to an embodiment of this application.

FIG. 1 is a schematic diagram of a structure of an audio encoding and decoding system according to an example embodiment of this application. The audio encoding and decoding system includes an encoding component 110 and a decoding component 120.

The encoding component 110 is configured to encode a current frame (an audio signal) in frequency domain or time domain. Optionally, the encoding component 110 may be implemented by software, or may be implemented by hardware, or may be implemented in a form of a combination of software and hardware. This is not limited in this embodiment of this application.

Figure 2:
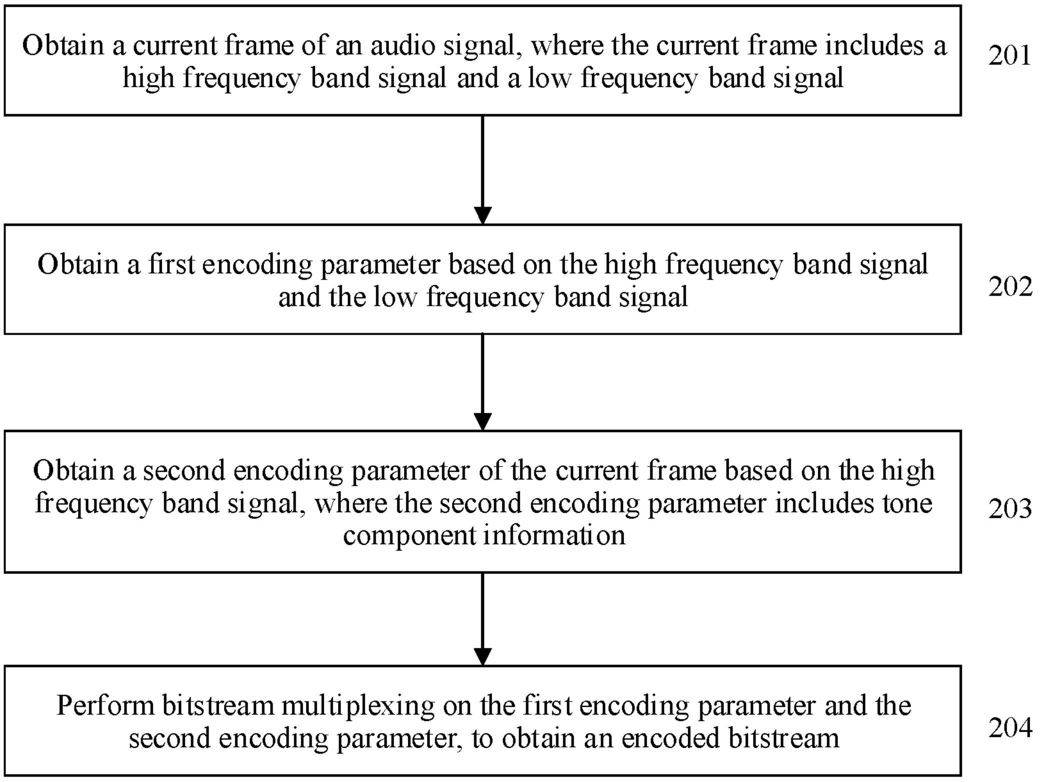
FIG. 2 is a schematic flowchart of an audio encoding method according to an embodiment of this application.

When the encoding component 110 encodes the current frame in frequency domain or time domain, in a possible embodiment, steps shown in FIG. 2 may be included.

Optionally, the encoding component 110 may be connected to the decoding component 120 wiredly or wirelessly. The decoding component 120 may obtain, by using the connection between the decoding component 120 and the encoding component 110, an encoded bitstream generated by the encoding component 110. Alternatively, the encoding component 110 may store the generated encoded bitstream in a memory, and the decoding component 120 reads the encoded bitstream in the memory.

Optionally, the decoding component 120 may be implemented by software, or may be implemented by hardware, or may be implemented in a form of a combination of software and hardware. This is not limited in this embodiment of this application.

Figure 3:
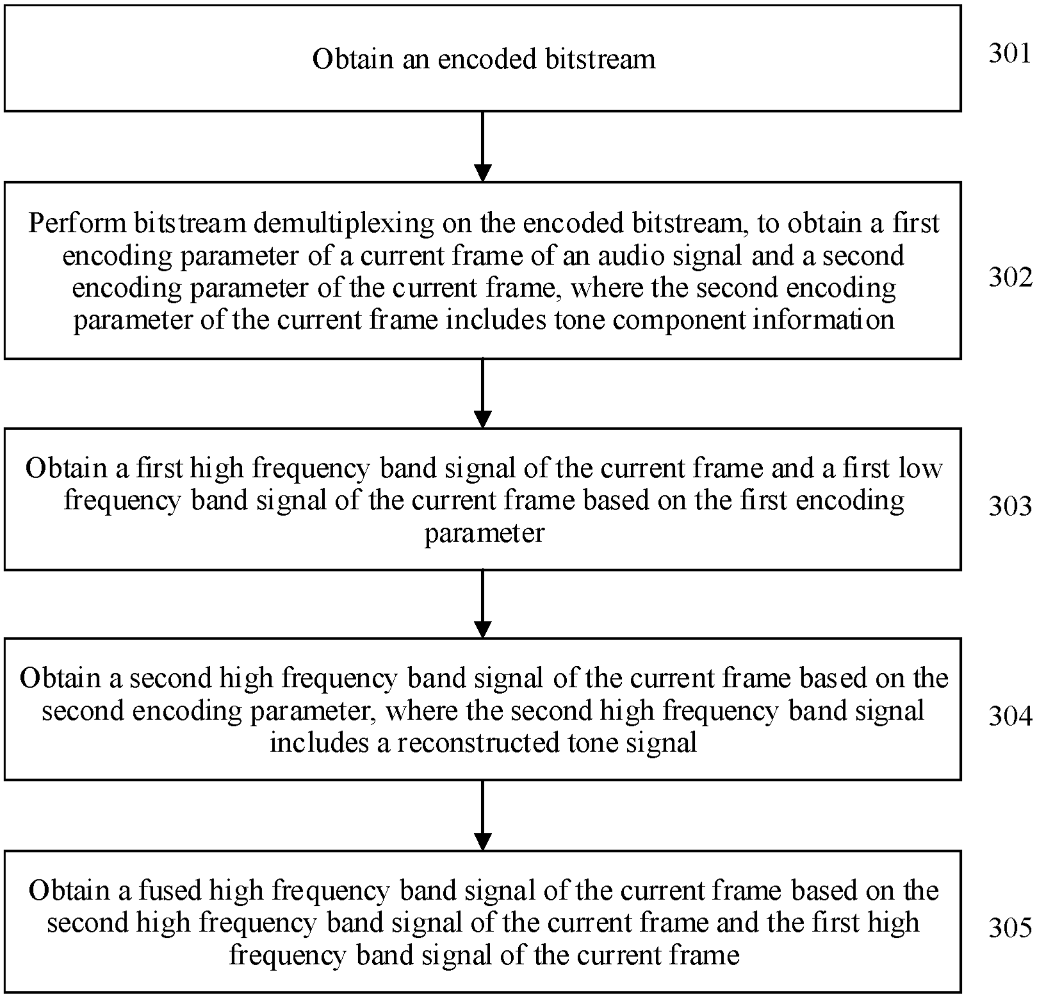
FIG. 3 is a schematic flowchart of an audio decoding method according to an embodiment of this application.

When the decoding component 120 decodes a current frame (an audio signal) in frequency domain or time domain, in a possible embodiment, steps shown in FIG. 3 may be included.

Optionally, the encoding component 110 and the decoding component 120 may be disposed in a same device, or may be disposed in different devices. The device may be a terminal having an audio signal processing function, such as a mobile phone, a tablet computer, a laptop computer, a desktop computer, a Bluetooth speaker, a pen recorder, or a wearable device. Alternatively, the device may be a network element having an audio signal processing capability in a core network or a wireless network. This is not limited in this embodiment.

Figure 4:
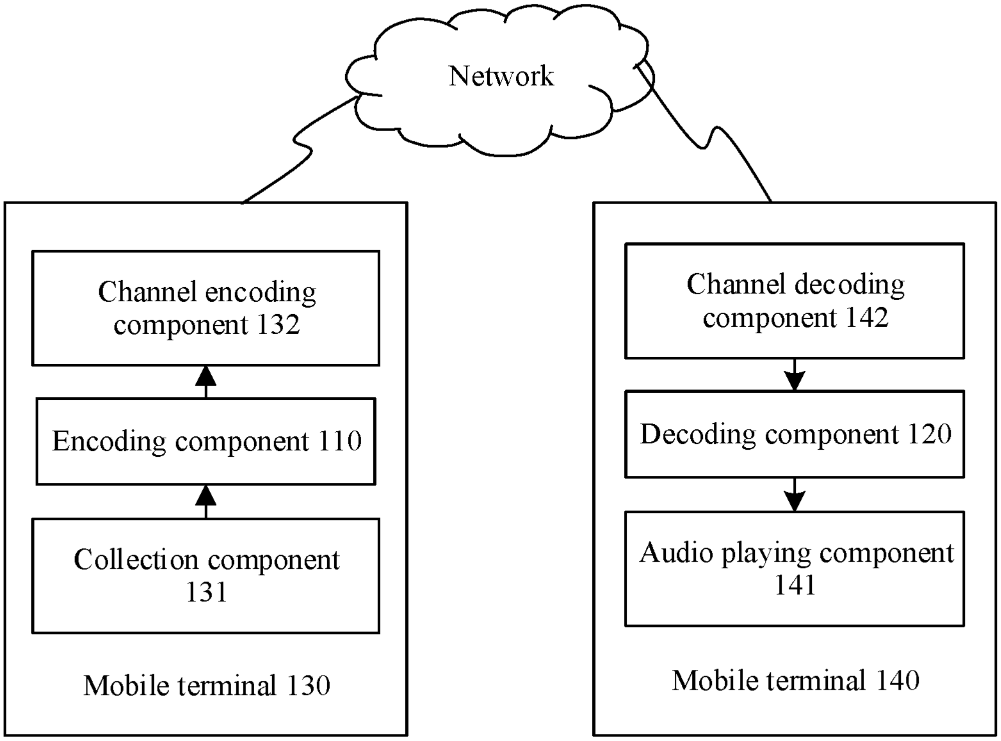
FIG. 4 is a schematic diagram of a mobile terminal according to an embodiment of this application.

For example, as shown in FIG. 4, the following example is used for description in this embodiment. The encoding component 110 is disposed in a mobile terminal 130, and the decoding component 120 is disposed in a mobile terminal 140. The mobile terminal 130 and the mobile terminal 140 are mutually independent electronic devices having an audio signal processing capability. For example, the mobile terminal 130 and the mobile terminal 140 may be mobile phones, wearable devices, virtual reality (VR) devices, or augmented reality (AR) devices. In addition, the mobile terminal 130 and the mobile terminal 140 are connected by using a wireless or wired network.

Optionally, the mobile terminal 130 may include a collection component 131, the encoding component 110, and a channel encoding component 132. The collection component 131 is connected to the encoding component 110, and the encoding component 110 is connected to the encoding component 132.

Optionally, the mobile terminal 140 may include an audio playing component 141, the decoding component 120, and a channel decoding component 142. The audio playing component 141 is connected to the decoding component 120, and the decoding component 120 is connected to the channel decoding component 142.

After collecting an audio signal through the collection component 131, the mobile terminal 130 encodes the audio signal by using the encoding component 110, to obtain an encoded bitstream; and then encodes the encoded bitstream by using the channel encoding component 132, to obtain a transmission signal.

The mobile terminal 130 sends the transmission signal to the mobile terminal 140 by using the wireless or wired network.

After receiving the transmission signal, the mobile terminal 140 decodes the transmission signal by using the channel decoding component 142, to obtain the encoded bitstream; decodes the encoded bitstream by using the decoding component 110, to obtain the audio signal; and plays the audio signal by using the audio playing component. It may be understood that the mobile terminal 130 may alternatively include the components included in the mobile terminal 140, and the mobile terminal 140 may alternatively include the components included in the mobile terminal 130.

Figure 5:
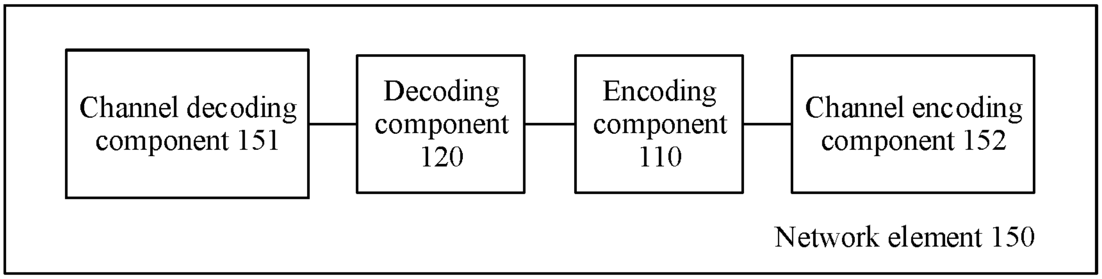
FIG. 5 is a schematic diagram of a network element according to an embodiment of this application.

For example, as shown in FIG. 5, the following example is used for description. The encoding component 110 and the decoding component 120 are disposed in one network element 150 having an audio signal processing capability in a core network or wireless network.

Optionally, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a transmission signal sent by another device, the channel decoding component 151 decodes the transmission signal to obtain a first encoded bitstream. The decoding component 120 decodes the encoded bitstream to obtain an audio signal. The encoding component 110 encodes the audio signal to obtain a second encoded bitstream. The channel encoding component 152 encodes the second encoded bitstream to obtain the transmission signal.

The another device may be a mobile terminal having an audio signal processing capability, or may be another network element having an audio signal processing capability. This is not limited in this embodiment.

Optionally, the encoding component 110 and the decoding component 120 in the network element may transcode an encoded bitstream sent by a mobile terminal.

Optionally, in this embodiment of this application, a device on which the encoding component 110 is installed may be referred to as an audio encoding device. In actual embodiment, the audio encoding device may also have an audio decoding function. This is not limited in this embodiment of this application.

Optionally, in this embodiment of this application, a device on which the decoding component 120 is installed may be referred to as an audio decoding device. In actual embodiment, the audio decoding device may also have an audio encoding function. This is not limited in this embodiment of this application.

FIG. 2 describes a procedure of an audio encoding method according to an embodiment of the present disclosure.

201: Obtain a current frame of an audio signal, where the current frame includes a high frequency band signal and a low frequency band signal.

The current frame may be any frame in the audio signal, and the current frame may include a high frequency band signal and a low frequency band signal. Division of a high frequency band signal and a low frequency band signal may be determined by using a frequency band threshold, a signal higher than the frequency band threshold is a high frequency band signal, and a signal lower than the frequency band threshold is a low frequency band signal. The frequency band threshold may be determined based on a transmission bandwidth and data processing capabilities of the encoding component 110 and the decoding component 120. This is not limited herein.

The high frequency band signal and the low frequency band signal are relative. For example, a signal lower than a frequency is a low frequency band signal, but a signal higher than the frequency is a high frequency band signal (a signal corresponding to the frequency may be a low frequency band signal or a high frequency band signal). The frequency varies with a bandwidth of the current frame. For example, when the current frame is a wideband signal of 0 to 8 kHz, the frequency may be 4 kHz. When the current frame is an ultra-wideband signal of 0 to 16 kHz, the frequency may be 8 kHz.

202: Obtain a first encoding parameter based on the high frequency band signal and the low frequency band signal.

The first encoding parameter may specifically include a time domain noise shaping parameter, a frequency domain noise shaping parameter, a spectrum quantization parameter, a frequency band extension parameter, and the like.

203: Obtain a second encoding parameter of the current frame based on the high frequency band signal, where the second encoding parameter includes tone component information.

In an embodiment, the tone component information includes at least one of tone component quantity information, tone component location information, tone component amplitude information, or tone component energy information. There is only one piece of amplitude information and only one piece of energy information.

In an embodiment, step 203 may be performed only when the high frequency band signal includes a tone component. In this case, the obtaining a second encoding parameter of the current frame based on the high frequency band signal may include: detecting whether the high frequency band signal includes a tone component; and if the high frequency band signal includes a tone component, obtaining the second encoding parameter of the current frame based on the high frequency band signal.

In an embodiment, the second encoding parameter may further include a noise floor parameter. For example, the noise floor parameter may be used to indicate noise floor energy.

204: Perform bitstream multiplexing on the first encoding parameter and the second encoding parameter, to obtain an encoded bitstream.

It can be learned from the foregoing descriptions that, in this embodiment of the present disclosure, an audio encoder encodes the tone component information, so that the audio decoder can decode the audio signal based on the received tone component information, and can more accurately recover the tone component in the audio signal, thereby improving quality of the decoded audio signal.

FIG. 3 describes a procedure of an audio decoding method according to another embodiment of the present disclosure.

301: Obtain an encoded bitstream.

302: Perform bitstream demultiplexing on the encoded bitstream, to obtain a first encoding parameter of a current frame of an audio signal and a second encoding parameter of the current frame, where the second encoding parameter of the current frame includes tone component information.

For the first encoding parameter and the second encoding parameter, refer to the encoding method. Details are not described herein again.

303: Obtain a first high frequency band signal of the current frame and a first low frequency band signal of the current frame based on the first encoding parameter.

The first high frequency band signal includes at least one of a decoded high frequency band signal obtained by performing direct decoding based on the first encoding parameter, and an extended high frequency band signal obtained by performing frequency band extension based on the first low frequency band signal.

304: Obtain a second high frequency band signal of the current frame based on the second encoding parameter, where the second high frequency band signal includes a reconstructed tone signal.

If the first high frequency band signal includes the extended high frequency band signal, the obtaining a fused high frequency band signal of the current frame based on the second high frequency band signal of the current frame and the first high frequency band signal of the current frame may include: if a value of a spectrum of a reconstructed tone signal on a current frequency of a current sub-band of the current frame meets a preset condition, obtaining a fused high frequency band signal on the current frequency based on a spectrum of an extended high frequency band signal on the current frequency and noise floor information of the current sub-band; or if a value of a spectrum of a reconstructed tone signal on a current frequency of a current sub-band of the current frame does not meet a preset condition, obtaining a fused high frequency band signal on the current frequency based on the spectrum of the reconstructed tone signal on the current frequency.

The noise floor information may include a noise floor gain parameter. In an embodiment, the noise floor gain parameter of the current sub-band is obtained based on a width of the current sub-band, energy of a spectrum of an extended high frequency band signal of the current sub-band, and noise floor energy of the current sub-band.

If the first high frequency band signal includes the decoded high frequency band signal and the extended high frequency band signal, the obtaining a fused high frequency band signal of the current frame based on the second high frequency band signal of the current frame and the first high frequency band signal of the current frame may include: if a value of a spectrum of a reconstructed tone signal on a current frequency of a current sub-band of the current frame does not meet a preset condition, obtaining a fused high frequency band signal on the current frequency based on the spectrum of the reconstructed tone signal on the current frequency; or if a value of a spectrum of a reconstructed tone signal on a current frequency of a current sub-band of the current frame meets a preset condition, obtaining a fused high frequency band signal on the current frequency based on a spectrum of an extended high frequency band signal on the current frequency, a spectrum of a decoded high frequency band signal on the current frequency, and noise floor information of the current sub-band.

The noise floor information includes a noise floor gain parameter. The noise floor gain parameter of the current sub-band is obtained based on a width of the current sub-band, noise floor energy of the current sub-band, energy of a spectrum of an extended high frequency band signal of the current sub-band, and energy of a spectrum of a decoded high frequency band signal of the current sub-band.

In an embodiment of the present disclosure, the preset condition includes: the value of the spectrum of the reconstructed tone signal is 0. In another embodiment of the present disclosure, the preset condition includes: the value of the spectrum of the reconstructed tone signal is less than a preset threshold, and the preset threshold is a real number greater than 0.

305: Obtain a fused high frequency band signal of the current frame based on the second high frequency band signal of the current frame and the first high frequency band signal of the current frame.

It can be learned from the foregoing descriptions that, in this embodiment of the present disclosure, an audio encoder encodes the tone component information, so that the audio decoder can decode the audio signal based on the received tone component information, and can more accurately recover the tone component in the audio signal, thereby improving quality of the decoded audio signal.

In another embodiment, if the first high frequency band signal includes the decoded high frequency band signal and the extended high frequency band signal, the audio decoding method described in FIG. 3 may further include:

selecting at least one signal from the decoded high frequency band signal, the extended high frequency band signal, and the reconstructed tone signal based on preset indication information or indication information obtained through decoding, to obtain the fused high frequency band signal of the current frame.

For example, in an embodiment of the present disclosure, in an sfb$^{th}$ sub-band of the high frequency band signal of the current frame, the spectrum of the decoded high frequency band signal obtained by performing direct decoding based on the first encoding parameter is denoted as enc_spec[sfb], the spectrum of the extended high frequency band signal obtained by performing frequency band extension based on the first low frequency band signal is denoted as patch_spec[sfb], and the spectrum of the reconstructed tone signal is denoted as recon_spec[sfb]. The noise floor energy is denoted as $E_{noise\_floor}$[sfb]. For example, the noise floor energy may be obtained based on a noise floor energy parameter $E_{noise\_floor}$[tile] of a spectrum interval according to a correspondence between a spectrum interval and a sub-band, that is, noise floor energy of each sfb in a tile$^{th}$ spectrum interval is equal to $E_{noise\_floor}$[tile].

For the sfb$^{th}$ high frequency sub-band, the obtaining a fused high frequency band signal of the current frame based on the second high frequency band signal of the current frame and the first high frequency band signal of the current frame may include the following cases:

Case 1:

If only patch_spec[sfb] exists in the sfb$^{th}$ sub-band, a fused signal spectrum of the sfb$^{th}$ sub-band is expressed as:

$$merge\_spec[sfb][k]=patch\_spec[sfb][k], k\in[sfb\_offset[sfb], sfb\_offset[sfb+1]).$$

Herein, merge_spec[sfb][k] represents a fused signal spectrum on a k$^{th}$ frequency of the sfb$^{th}$ sub-band, sfb_offset is a sub-band division table, and sfb_offset[sfb] and sfb_offset[sfb+1] are respectively start points of the sfb$^{th}$ sub-band and an (sfb+1)$^{th}$ sub-band.

Case 2:

If only patch_spec[sfb] and enc_spec[sfb] exist in the sfb$^{th}$ sub-band, a fused signal spectrum of the sfb$^{th}$ sub-band is obtained by combining patch_spec[sfb] and enc_spec[sfb]:

If enc_spec[sfb][k] is 0 on a k$^{th}$ frequency of the sfb$^{th}$ sub-band, $$merge\_spec[sfb][k]=patch\_spec[sfb][k], \text{ if } enc\_spec[sfb][k]=0.$$

If enc_spec[sfb][k] is not 0 on a k$^{th}$ frequency of the sfb$^{th}$ sub-band, $$merge\_spec[sfb][k]=enc\_spec[sfb][k], \text{ if } enc\_spec[sfb][k]!=0.$$

Case 3:

If only patch_spec[sfb] and recon_spec[sfb] exist in the sfb$^{th}$ sub-band, a fused signal spectrum of the sfb$^{th}$ sub-band is obtained by combining patch_spec[sfb] and recon_spec[sfb].

If recon_spec[sfb][k] is 0 on a k$^{th}$ frequency of the sfb$^{th}$ sub-band, $$merge\_spec[sfb][k]=g_{noise\_floor}[sfb]*patch\_spec[sfb][k], \text{ if } recon\_spec[sfb][k]=0.$$

Herein, $g_{noise\_floor}$[sfb] is a noise floor gain parameter of the sfb$^{th}$ sub-band, and is obtained through calculation based on a noise floor energy parameter of the sfb$^{th}$ sub-band and energy of patch_spec[sfb], that is, $$g_{noise\_floor}[sfb]=\left(\frac{E_{noise\_floor}[sfb]*\text{sfb\_width}[sfb]}{E_{patch}[sfb]}\right)^{1/2}.$$

Herein, sfb_width[sfb] is a width of the sfb$^{th}$ sub-band, and is expressed as:

$$sfb\_width[sfb]=sfb\_offset[sfb+1]-sfb\_offset[sfb].$$

Herein, $E_{patch}$[sfb] is the energy of patch_spec[sfb]. A calculation process is:

$$E_{patch}[sfb]=\Sigma_k(patch\_spec[sfb][k])^2.$$

Herein, a value range of k is k∈[sfb_offset[sfb], sfb_offset[sfb+1]).

If recon_spec[sfb][k] is not 0 on a k$^{th}$ frequency of the sfb$^{th}$ sub-band, merge_spec[sfb][k]=recon_spec[sfb][k], if recon_spec[sfb][k]!=0.

Case 4:

If enc_spec[sfb], patch_spec[sfb], and recon_spec[sfb] exist in the $sfb^{th}$ sub-band, a fused signal may be obtained by combining enc_spec[sfb], patch_spec[sfb], and recon_spec [sfb].

There may be two fusion manners. One is to combine spectrums of enc_spec[sfb], patch_spec[sfb], and recon_spec[sfb], where recon_spec[sfb] is a main component, and energy of enc_spec[sfb] and energy patch_spec[sfb] are adjusted to a noise floor energy level. The other is to combine enc_spec[sfb] and patch_spec[sfb].

Manner 1:

A spectrum of a high-frequency signal obtained based on patch_spec[sfb] and enc_spec[sfb] is adjusted by using a noise floor gain, and recon_spec[sfb] is combined with patch_spec[sfb] and enc_spec[sfb], to obtain a fused signal spectrum.

A specific method is as follows:

If recon_spec[sfb][k] is not 0 on a k'h frequency of the $sfb^{th}$ sub-band, $$\text{merge\_spec}[sfb][k]=\text{recon\_spec}[sfb][k],\ \text{if recon\_spec}[sfb][k]!=0.$$

If recon_spec[sfb][k] is 0 on a k'h frequency of the $sfb^{th}$ sub-band, $$\text{merge\_spec}[sfb][k]=g_{noise\_floor}[sfb]*(\text{patch\_spec}[sfb][k]+\text{enc\_spec}[sfb][k]),\ \text{if recon\_spec}[sfb][k]=0.$$

Herein, $g_{noise\_floor}$[sfb] is a noise floor gain parameter of the $sfb^{th}$ sub-band, and is obtained through calculation based on a noise floor energy parameter of the $sfb^{th}$ sub-band, energy of patch_spec[sfb], and energy of enc_spec[sfb], that is, $$g_{noise\_floor}[sfb]=\left(\frac{E_{noise\_floor}[sfb]*\text{sfb\_width}[sfb]}{E_{patch}[sfb]+E_{enc}[sfb]}\right)^{1/2}.$$

Herein, $E_{patch}$[sfb] is the energy of patch_spec[sfb]. $E_{enc}$[sfb] is the energy of enc_spec[sfb]. A calculation process is:

$$E_{enc}[sfb]=Z_k(\text{enc\_spec}[sfb][k])^2.$$

Herein, a value range of k is k∈ [sfb_offset[sfb], sfb_offset [sfb+1]).

Manner 2:

Recon_spec[sfb] is not reserved. A fusion signal includes patch_spec[sfb] and enc_spec[sfb].

A specific embodiment is the same as that in Case 2.

Selection policies in Manner 1 and Manner 2:

One of the foregoing two high frequency spectrum fusion methods in Manner 1 and Manner 2 may be selected in a preset manner, or may be determined in a specific manner. For example, Manner 1 is selected when a signal meets a preset condition. A specific selection manner is not limited in this embodiment of the present disclosure.

Figure 6:
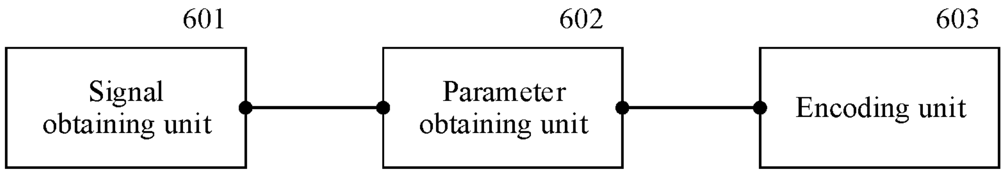
FIG. 6 is a schematic diagram of a composition structure of an audio encoding device according to an embodiment of this application.

FIG. 6 describes a structure of an audio encoder according to an embodiment of the present disclosure, including:

a signal obtaining unit 601, configured to obtain a current frame of an audio signal, where the current frame includes a high frequency band signal and a low frequency band signal;

a parameter obtaining unit 602, configured to: obtain a first encoding parameter based on the high frequency band signal and the low frequency band signal; and obtain a second encoding parameter of the current frame based on the high frequency band signal, where the second encoding parameter includes tone component information; and an encoding unit 603, configured to perform bitstream multiplexing on the first encoding parameter and the second encoding parameter, to obtain an encoded bitstream.

For specific embodiment of the audio encoder, refer to the foregoing audio encoding method. Details are not described herein again.

Figure 7:
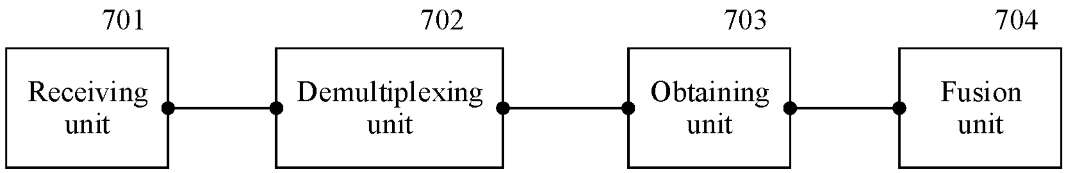
FIG. 7 is a schematic diagram of a composition structure of an audio decoding device according to an embodiment of this application.

FIG. 7 describes a structure of an audio decoder according to an embodiment of the present disclosure, including:

a receiving unit 701, configured to obtain an encoded bitstream;

a demultiplexing unit 702, configured to perform bitstream demultiplexing on the encoded bitstream, to obtain a first encoding parameter of a current frame of an audio signal and a second encoding parameter of the current frame, where the second encoding parameter of the current frame includes tone component information;

an obtaining unit 703, configured to: obtain a first high frequency band signal of the current frame and a first low frequency band signal of the current frame based on the first encoding parameter; and obtain a second high frequency band signal of the current frame based on the second encoding parameter, where the second high frequency band signal includes a reconstructed tone signal; and a fusion unit 704, configured to obtain a fused high frequency band signal of the current frame based on the second high frequency band signal of the current frame and the first high frequency band signal of the current frame.

For specific embodiment of the audio decoder, refer to the foregoing audio decoding method. Details are not described herein again.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

An embodiment of the present disclosure further provides a computer-readable storage medium, including instructions. When the instructions are run on a computer, the computer is enabled to perform the foregoing audio encoding method or the foregoing audio decoding method.

An embodiment of the present disclosure further provides a computer program product including instructions. When the computer program product is run on a computer, the computer is enabled to perform the foregoing audio encoding method or the foregoing audio decoding method.

An embodiment of this application further provides a computer storage medium. The computer storage medium stores a program, and the program is used to perform some or all of the steps described in the method embodiments.

Figure 8:
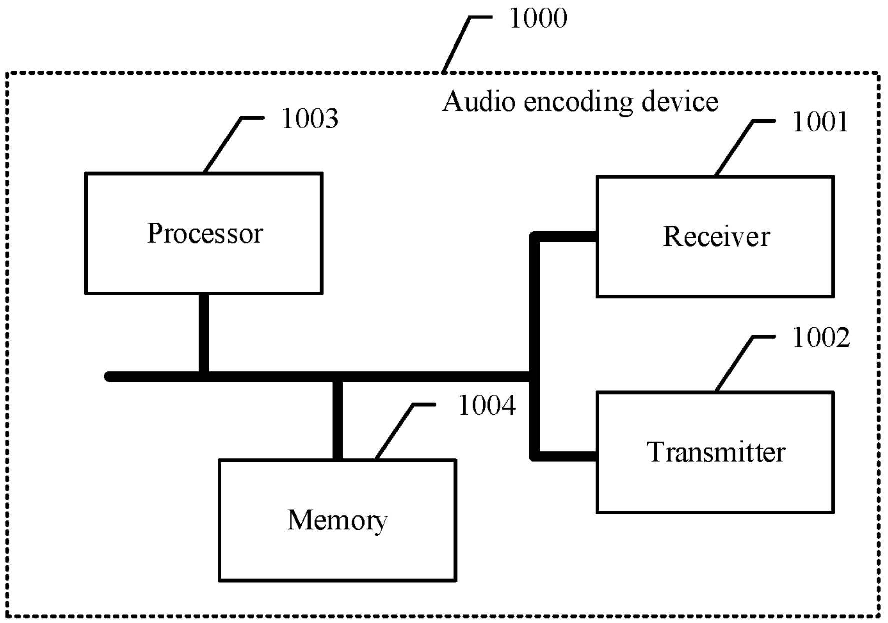
FIG. 8 is a schematic diagram of a composition structure of another audio encoding device according to an embodiment of this application.

The following describes another audio encoding device according to an embodiment of this application. Referring to FIG. 8, the audio encoding device 1000 includes:

a receiver 1001, a transmitter 1002, a processor 1003, and a memory 1004 (there may be one or more processors 1003 in the audio encoding device 1000, and an example in which there is one processor is used in FIG. 8). In some embodiments of this application, the receiver 1001, the transmitter 1002, the processor 1003, and the memory 1004 may be connected by using a bus or in another manner. In FIG. 8, an example in which the receiver 1001, the transmitter 1002, the processor 1003, and the memory 1004 are connected by using a bus is used.

The memory 1004 may include a read-only memory and a random access memory, and provide instructions and data for the processor 1003. A part of the memory 1004 may further include a nonvolatile random access memory (NVRAM). The memory 1004 stores an operating system and an operation instruction, an executable module or a data structure, or a subset thereof, or an extended set thereof. The operation instruction may include various operation instructions to implement various operations. The operating system may include various system programs for implementing various basic services and processing hardware-based tasks.

The processor 1003 controls an operation of the audio encoding device, and the processor 1003 may also be referred to as a central processing unit (CPU). In specific application, the components of the audio encoding device are coupled together by using a bus system. In addition to a data bus, the bus system may further include a power bus, a control bus, and a status signal bus. However, for clarity of description, various types of buses in the figure are marked as the bus system.

The methods disclosed in the embodiments of this application may be applied to the processor 1003, or implemented by the processor 1003. The processor 1003 may be an integrated circuit chip and has a signal processing capability. In an embodiment process, the steps in the foregoing methods can be implemented by using a hardware integrated logical circuit in the processor 1003, or by using instructions in a form of software. The processor 1003 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor.

The receiver 1001 may be configured to: receive input number or character information, and generate signal input related to related settings and function control of the audio encoding device. The transmitter 1002 may include a display device such as a display, and the transmitter 1002 may be configured to output number or character information through an external interface.

In this embodiment of this application, the processor 1003 is configured to perform the foregoing audio encoding method.

Figure 9:
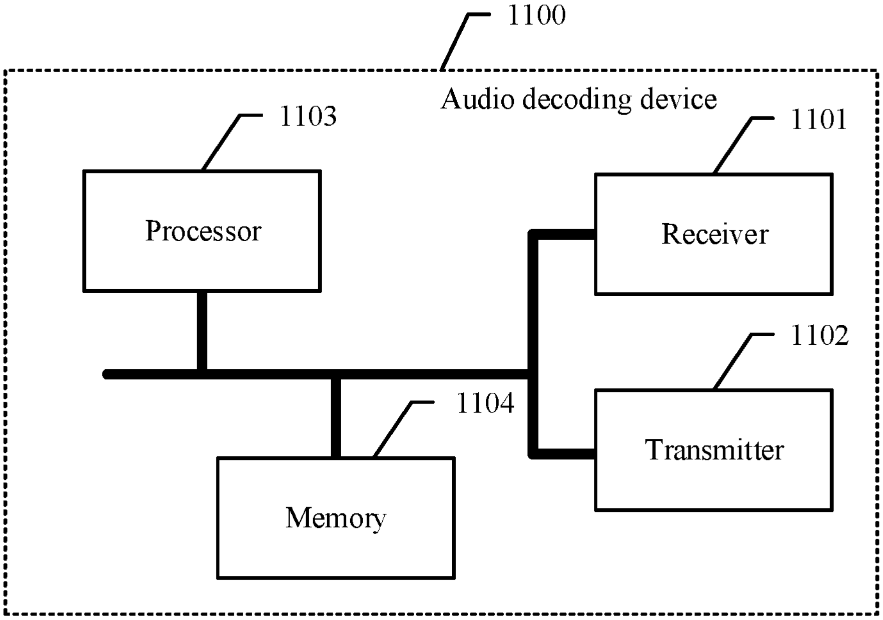
FIG. 9 is a schematic diagram of a composition structure of another audio decoding device according to an embodiment of this application.

The following describes another audio decoding device according to an embodiment of this application. Referring to FIG. 9, the audio decoding device 1100 includes:

a receiver 1101, a transmitter 1102, a processor 1103, and a memory 1104 (there may be one or more processors 1103 in the audio decoding device 1100, and an example in which there is one processor is used in FIG. 9). In some embodiments of this application, the receiver 1101, the transmitter 1102, the processor 1103, and the memory 1104 may be connected by using a bus or in another manner. In FIG. 9, an example in which the receiver 1101, the transmitter 1102, the processor 1103, and the memory 1104 are connected by using a bus is used.

The memory 1104 may include a read-only memory and a random access memory, and provide instructions and data for the processor 1103. A part of the memory 1104 may further include an NVRAM. The memory 1104 stores an operating system and an operation instruction, an executable module or a data structure, a subset thereof, or an extended set thereof. The operation instruction may include various operation instructions to implement various operations. The operating system may include various system programs for implementing various basic services and processing hardware-based tasks.

The processor 1103 controls an operation of the audio decoding device, and the processor 1103 may also be referred to as a CPU. In specific application, the components of the audio decoding device are coupled together by using a bus system. In addition to a data bus, the bus system may further include a power bus, a control bus, and a status signal bus. However, for clarity of description, various types of buses in the figure are marked as the bus system.

The methods disclosed in the embodiments of this application may be applied to the processor 1103 or implemented by the processor 1103. The processor 1103 may be an integrated circuit chip and has a signal processing capability. In an embodiment process, the steps in the foregoing methods can be completed by using a hardware integrated logic circuit in the processor 1103 or instructions in a form of software. The processor 1103 may be a general-purpose processor, a DSP, an ASIC, an FPGA or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1104, and the processor 1103 reads information in the memory 1104 and completes the steps in the foregoing methods in combination with hardware of the processor.

In this embodiment of this application, the processor 1103 is configured to perform the foregoing audio decoding method.

In another possible design, when the audio encoding device or the audio decoding device is a chip in a terminal, the chip includes a processing unit and a communications unit. The processing unit may be, for example, a processor. The communications unit may be, for example, an input/output interface, a pin, or a circuit. The processing unit may execute computer-executable instructions stored in a storage unit, so that the chip in the terminal performs the method in the first aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that may store static information and instructions, for example, a random access memory (RAM).

The processor mentioned anywhere above may be a general-purpose central processing unit, a microprocessor, an ASIC, or one or more integrated circuits configured to control program execution of the method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected according to an actual need to achieve the objectives of the solutions of the embodiments. In addition, in the accompanying drawings of the apparatus embodiments provided in this application, connection relationships between modules indicate that the modules have communications connections with each other, which may be specifically implemented as one or more communications buses or signal cables.

Based on the description of the foregoing embodiments, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, a dedicated circuit, or the like. However, in this application, a software program embodiment is a better embodiment in most cases. Based on such an understanding, the technical solutions of this application essentially or the part contributing to the conventional technology may be implemented in a form of a software product. The software product is stored in a readable storage medium, such as a floppy disk, a USB flash drive, a removable hard disk, a ROM, a RAM, a magnetic disk, or a CD-ROM of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An audio encoding method, wherein the method comprises:

obtaining a current frame of an audio signal, wherein the current frame comprises a high frequency band signal and a low frequency band signal;

obtaining a first encoding parameter based on the high frequency band signal and the low frequency band signal, wherein the high frequency band signal comprises at least one of a decoded high frequency band signal, or an extended high frequency band signal;

detecting that the high frequency band signal comprises a tone component;

based on detecting that the high frequency band signal comprises a tone component, obtaining a second encoding parameter of the current frame based on the high frequency band signal, wherein the second encoding parameter comprises tone component information; and performing bitstream multiplexing on the first encoding parameter and the second encoding parameter, to obtain an encoded bitstream, wherein, responsive to the high frequency band signal comprising the extended high frequency band signal and a value of a spectrum of a reconstructed tone signal on a current frequency of a current sub-band of the current frame satisfying a preset condition, a fused high frequency band signal on the current frequency can be obtained based on a spectrum of an extended high frequency band signal on the current frequency and noise floor information of the current sub-band, wherein, responsive to the high frequency band signal comprising the extended high frequency band signal and a value of a spectrum of a reconstructed tone signal on a current frequency of a current sub-band of the current frame not satisfying the preset condition, a fused high frequency band signal on the current frequency can be obtained based on the spectrum of the reconstructed tone signal on the current frequency, and wherein the noise floor information comprises a noise floor gain parameter, wherein the noise floor gain parameter of the current sub-band is obtained based on a width of the current sub-band, energy of a spectrum of an extended high frequency band signal of the current sub-band, and noise floor energy of the current sub-band.

2. The method according to claim 1, wherein the tone component information comprises at least one of tone component quantity information, tone component location information, tone component amplitude information, or tone component energy information.

3. An audio decoding method, wherein the method comprises:

obtaining an encoded bitstream;

performing bitstream demultiplexing on the encoded bitstream, to obtain a first encoding parameter of a current frame of an audio signal and a second encoding parameter of the current frame, wherein the second encoding parameter of the current frame comprises tone component information;

obtaining a first high frequency band signal of the current frame and a first low frequency band signal of the current frame based on the first encoding parameter, wherein the second encoding parameter is obtained based on the first high frequency band signal, based on detecting that the first high frequency band signal comprises a tone component, and wherein the first high frequency band signal comprises at least one of a decoded high frequency band signal obtained by performing direct decoding based on the first encoding parameter, or an extended high frequency band signal obtained by performing frequency band extension based on the first low frequency band signal;

obtaining a second high frequency band signal of the current frame based on the second encoding parameter, wherein the second high frequency band signal comprises a reconstructed tone signal; and obtaining a fused high frequency band signal of the current frame based on the second high frequency band signal of the current frame and the first high frequency band signal of the current frame, wherein, responsive to the first high frequency band signal comprising the extended high frequency band signal, the obtaining the fused high frequency band signal of the current frame based on the second high frequency band signal of the current frame and the first high frequency band signal of the current frame comprises:

responsive to a value of a spectrum of a reconstructed tone signal on a current frequency of a current sub-band of the current frame satisfying a preset condition, obtaining a fused high frequency band signal on the current frequency based on a spectrum of an extended high frequency band signal on the current frequency and noise floor information of the current sub-band; or responsive to a value of a spectrum of a reconstructed tone signal on a current frequency of a current sub-band of the current frame not satisfying the preset condition, obtaining a fused high frequency band signal on the current frequency based on the spectrum of the reconstructed tone signal on the current frequency, wherein the noise floor information comprises a noise floor gain parameter, wherein the noise floor gain parameter of the current sub-band is obtained based on a width of the current sub-band, energy of a spectrum of an extended high frequency band signal of the current sub-band, and noise floor energy of the current sub-band.

4. The method according to claim 3, wherein when the first high frequency band signal comprises the decoded high frequency band signal and the extended high frequency band signal, the obtaining a fused high frequency band signal of the current frame based on the second high frequency band signal of the current frame and the first high frequency band signal of the current frame comprises:

when a value of a spectrum of a reconstructed tone signal on a current frequency of a current sub-band of the current frame does not satisfy a preset condition, obtaining a fused high frequency band signal on the current frequency based on the spectrum of the reconstructed tone signal on the current frequency; or when a value of a spectrum of a reconstructed tone signal on a current frequency of a current sub-band of the current frame satisfies the preset condition, obtaining a fused high frequency band signal on the current frequency based on a spectrum of an extended high frequency band signal on the current frequency, a spectrum of a decoded high frequency band signal on the current frequency, and noise floor information of the current sub-band.

5. The method according to claim 4, wherein the noise floor information comprises a noise floor gain parameter, wherein the noise floor gain parameter of the current sub-band is obtained based on a width of the current sub-band, noise floor energy of the current sub-band, energy of a spectrum of an extended high frequency band signal of the current sub-band, and energy of a spectrum of a decoded high frequency band signal of the current sub-band.

6. The method according to claim 3, wherein when the first high frequency band signal comprises the decoded high frequency band signal and the extended high frequency band signal, the method further comprises:

selecting at least one signal from the decoded high frequency band signal, the extended high frequency band signal, and the reconstructed tone signal based on preset indication information or indication information obtained through decoding, to obtain the fused high frequency band signal of the current frame.

7. The method according to claim 3, wherein the preset condition comprises: the value of the spectrum of the reconstructed tone signal is 0 or less than a preset threshold.

8. An audio encoder, comprising:

at least one processor; and one or more memories coupled to the at least one processor and storing programming instructions, which when executed by the at least one processor cause the audio encoder to implement a method comprising:

obtaining a current frame of an audio signal, wherein the current frame comprises a high frequency band signal and a low frequency band signal;

obtaining a first encoding parameter based on the high frequency band signal and the low frequency band signal, wherein the high frequency band signal comprises at least one of a decoded high frequency band signal, or an extended high frequency band signal;

detecting that the high frequency band signal comprises a tone component;

based on detecting that the high frequency band signal comprises a tone component, obtaining a second encoding parameter of the current frame based on the high frequency band signal, wherein the second encoding parameter comprises tone component information; and performing bitstream multiplexing on the first encoding parameter and the second encoding parameter, to obtain an encoded bitstream, wherein, responsive to the high frequency band signal comprising the extended high frequency band signal and a value of a spectrum of a reconstructed tone signal on a current frequency of a current sub-band of the current frame satisfying a preset condition, a fused high frequency band signal on the current frequency can be obtained based on a spectrum of an extended high frequency band signal on the current frequency and noise floor information of the current sub-band, wherein, responsive to the high frequency band signal comprising the extended high frequency band signal and a value of a spectrum of a reconstructed tone signal on a current frequency of a current sub-band of the current frame not satisfying the preset condition, a fused high frequency band signal on the current frequency can be obtained based on the spectrum of the reconstructed tone signal on the current frequency, and wherein the noise floor information comprises a noise floor gain parameter, wherein the noise floor gain parameter of the current sub-band is obtained based on a width of the current sub-band, energy of a spectrum of an extended high frequency band signal of the current sub-band, and noise floor energy of the current sub-band.

9. The audio encoder according to claim 8, wherein the tone component information comprises at least one of tone component quantity information, tone component location information, tone component amplitude information, or tone component energy information.

10. An audio decoder, comprising:

at least one processor; and one or more memories coupled to the at least one processor and storing programming instructions, which when executed by the at least one processor cause the audio decoder to implement a method comprising:

obtaining an encoded bitstream;

performing bitstream demultiplexing on the encoded bitstream, to obtain a first encoding parameter of a current frame of an audio signal and a second encoding parameter of the current frame, wherein the second encoding parameter of the current frame comprises tone component information;

obtaining a first high frequency band signal of the current frame and a first low frequency band signal of the current frame based on the first encoding parameter, wherein the second encoding parameter is obtained based on the first high frequency band signal, based on detecting that the first high frequency band signal comprises a tone component;

obtaining a second high frequency band signal of the current frame based on the second encoding parameter, wherein the second high frequency band signal comprises a reconstructed tone signal; and obtaining a fused high frequency band signal of the current frame based on the second high frequency band signal of the current frame and the first high frequency band signal of the current frame, wherein, responsive to the first high frequency band signal comprising an extended high frequency band signal obtained by performing frequency band extension based on the first low frequency band signal, the programming instructions, when executed by the at least one processor further cause the audio decoder further to:

responsive to a value of a spectrum of a reconstructed tone signal on a current frequency of a current sub-band of the current frame satisfying a preset condition, obtain a fused high frequency band signal on the current frequency based on a spectrum of an extended high frequency band signal on the current frequency and noise floor information of the current sub-band; or responsive to a value of a spectrum of a reconstructed tone signal on a current frequency of a current sub-band of the current frame not satisfying the preset condition, obtain a fused high frequency band signal on the current frequency based on the spectrum of the reconstructed tone signal on the current frequency, wherein the noise floor information comprises a noise floor gain parameter, wherein the noise floor gain parameter of the current sub-band is obtained based on a width of the current sub-band, energy of a spectrum of an extended high frequency band signal of the current sub-band, and noise floor energy of the current sub-band.

11. The audio decoder according to claim 10, wherein when the first high frequency band signal comprises a decoded high frequency band signal obtained by performing direct decoding based on the first encoding parameter and an extended high frequency band signal obtained by performing frequency band extension based on the first low frequency band signal, the programming instructions, when executed by the at least one processor further cause the audio decoder further to:

obtain a fused high frequency band signal on a current frequency of a current sub-band of the current frame based on a spectrum of a reconstructed tone signal on the current frequency when a value of the spectrum of the reconstructed tone signal on the current frequency of the current sub-band of the current frame does not satisfy the preset condition; or obtain a fused high frequency band signal on a current frequency of a current sub-band of the current frame based on a spectrum of an extended high frequency band signal on the current frequency, a spectrum of a decoded high frequency band signal on the current frequency, and noise floor information of the current sub-band when a value of a spectrum of a reconstructed tone signal on the current frequency of the current sub-band of the current frame satisfies the preset condition.

12. The audio decoder according to claim 11, wherein the noise floor information comprises a noise floor gain parameter, wherein the noise floor gain parameter of the current sub-band is obtained based on a width of the current sub-band, noise floor energy of the current sub-band, energy of a spectrum of an extended high frequency band signal of the current sub-band, and energy of a spectrum of a decoded high frequency band signal of the current sub-band.

13. The audio decoder according to claim 10, wherein when the first high frequency band signal comprises a decoded high frequency band signal obtained by performing direct decoding based on the first encoding parameter, the programming instructions when executed by the at least one processor further cause the audio decoder further to:

select at least one signal from the decoded high frequency band signal, the extended high frequency band signal, and the reconstructed tone signal based on preset indication information or indication information obtained through decoding, to obtain the fused high frequency band signal of the current frame.

* * * * *